United States Patent [19]

Swan et al.

[11] Patent Number: 4,949,620
[45] Date of Patent: Aug. 21, 1990

[54] EDGE-REINFORCED PACKING FOR USE IN STEAM SERVICE

[75] Inventors: Charles F. Swan, Brooklin, Me.; George B. Champlin, Stoneham, Mass.

[73] Assignee: New England Braiding Company, Inc., Manchester, N.H.

[21] Appl. No.: 287,916

[22] Filed: Dec. 21, 1988

[51] Int. Cl.$^5$ .................. D04C 1/06; F16J 15/22; F16J 15/26; F16K 41/02
[52] U.S. Cl. ................................. 87/8; 87/1; 87/5; 87/7; 87/11; 277/227; 277/230; 277/DIG. 6
[58] Field of Search ................ 87/1, 5–8, 87/11; 277/227–230, DIG. 6

[56] References Cited

U.S. PATENT DOCUMENTS

| | | | |
|---|---|---|---|
| 239,287 | 3/1881 | Winans | 277/228 X |
| 741,056 | 10/1903 | Montgomery | 277/228 X |
| 2,562,262 | 7/1951 | DeWitt, Sr. | 87/7 X |
| 3,403,595 | 10/1968 | Watson | 87/1 |
| 4,550,639 | 11/1985 | Champlin | 87/7 |

Primary Examiner—John Petrakes
Attorney, Agent, or Firm—Robert K. Tendler

[57] ABSTRACT

Edge-reinforced packing is provided for steam service, with wire-reinforced secondary yarns on carriers driven along one or more diagonal tracks of a braiding machine to provide edge-reinforcing which reduces valve stem abrasion while providing sufficient resistance to high pressure, high temperature steam leakage. Wire-reinforcing only the edges of the packing minimizes the amount of reinforcing wire necessary to counteract high pressure steam and thus minimizes valve stem wear. An offset, alternating braid embodiment further reduces wire usage at the packing edges, while at the same time providing complete circumferential reinforced sealing around the valve stem. In cases where the offset braiding results in voids in the steam barrier produced by the reinforced braid, keystone-resisting technology corrects this problem. In one embodiment, the packing is a non-asbestos packing which eliminates both hardening and packing disintegration normally associated with so called "plastic-core" packings. In a further embodiment with reinforcing wire on both diagonals, the diagonal symmetry alleviates problems associated with installing the packing upside down in the stuffing box.

5 Claims, 7 Drawing Sheets

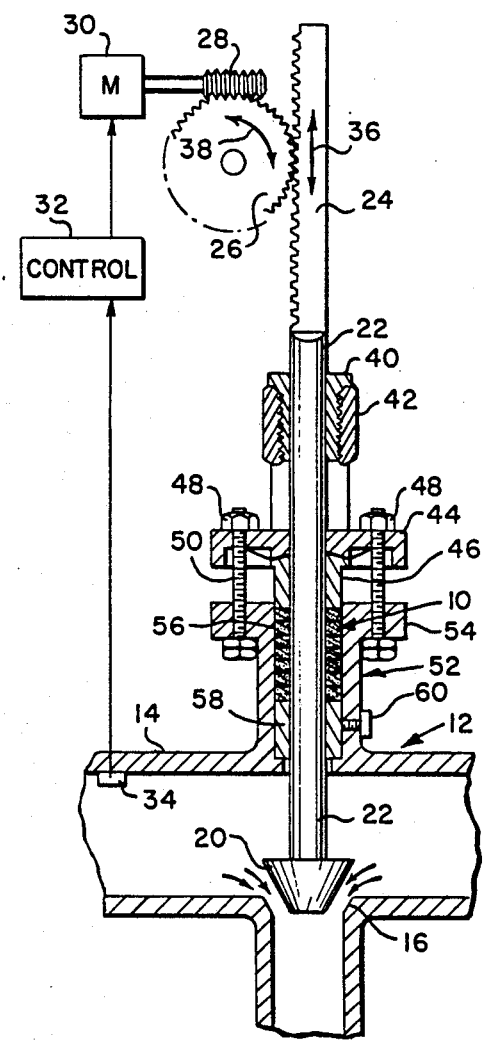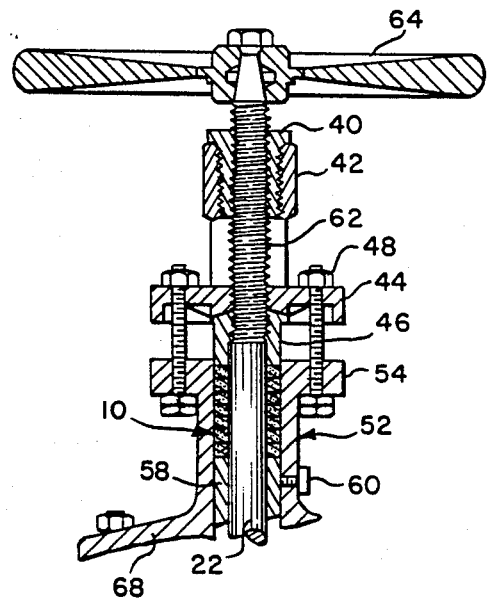
Fig. 1A
Fig. 1B

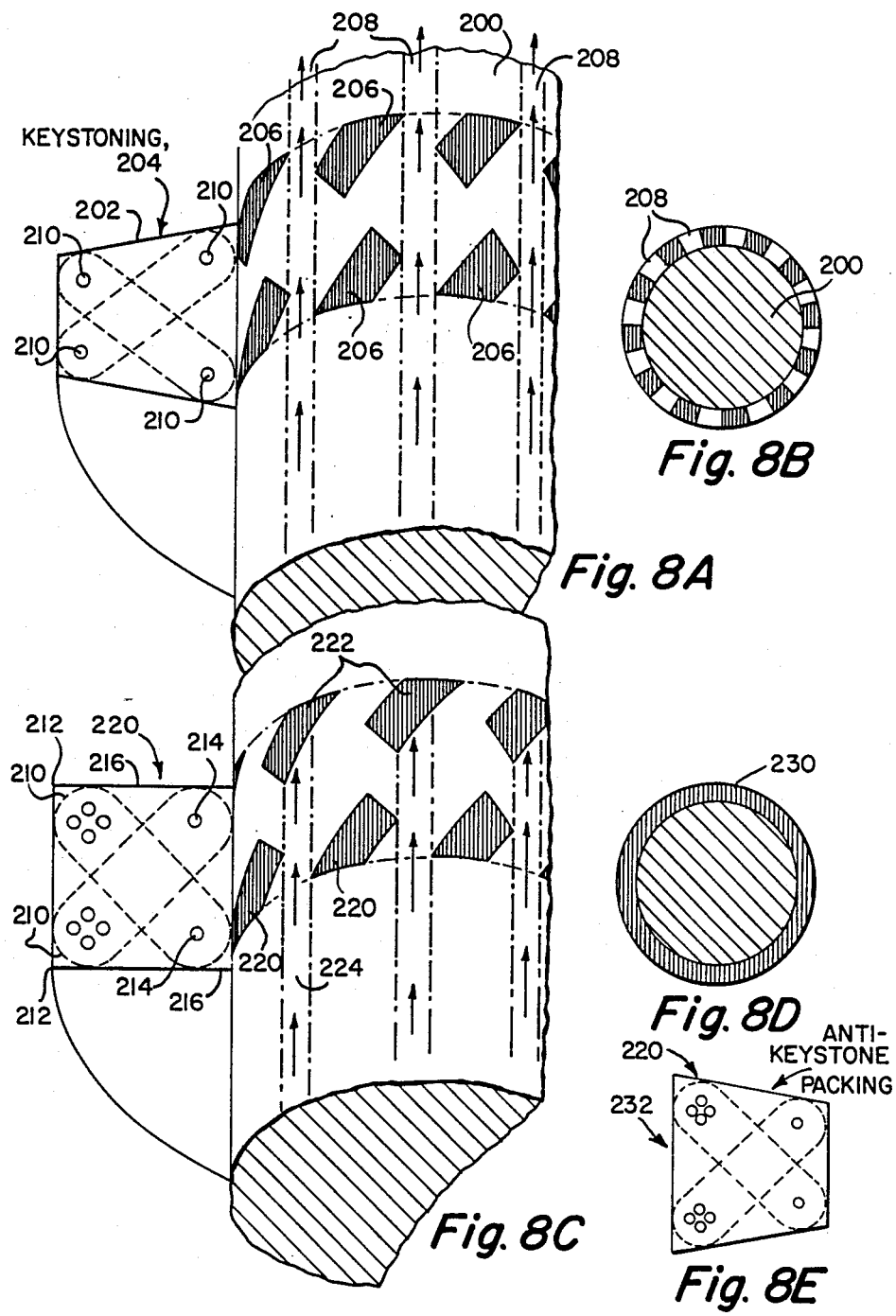

EDGE-REINFORCED PACKING FOR USE IN STEAM SERVICE

FIELD OF THE INVENTION

This invention relates to packing material for steam service and more particularly to a method and apparatus for minimizing steam leakage and extending packing life by providing a wire-reinforced packing material which results in minimum valve-stem wear, and a convenient orientation-independent installation.

BACKGROUND OF THE INVENTION

In the past there have been many attempts to provide packing materials for steam service. Because of the high pressure, high temperature superheated steam involved, ordinary packing materials cannot be utilized. Rather wire-reinforced asbestos-jacketed packings have been commonly utilized in steam valves. In automatic control steam valves, not only is steam integrity important due to 2000 psi and higher steam, but also valve stem erosion causes failure due to constant cycling, with the erosion being primarily due to wear produced by over use of reinforcing wire.

In general, prior steam service packings have been made on round braiders. Typically they use a resilient or pliable core material completely surrounded by a braided material in which the braid contains wire, usually Inconnel. Thus the packing is surrounded with reinforcing wire, which under pressure slices through the braid, contacts the valve stem and scores it because the Inconnel wire is harder than the commonly used steel or stainless steel valve stems. This causes leakage and subsequent catastrophic failure if the packing is not replaced frequently. Note the abraided particles from the valve stem also can cause packing failure, which with high pressure steam presents a very serious hazard, especially to those employed to repair a leak. As will be appreciated, when automatic steam control valves are used in electric power generation plants, oftentimes the turbines cannot be shut down, which necessitates repair in the presence of live steam presenting a hazardous leak stopping operation. It is thus necessary that the packing cause as little damage as possible to the valve stems while at the same time preventing steam leakage so that long packing life is assured.

Prior steam service packings include Crane style 187-I or Chesterton style 1500 which utilize a so-called "plastic" or flexible core of high purity asbestos, graphite flake, rubber, zinc and oil surrounded by wire-reinforced asbestos which is braided around the plastic core. The circumferential wire reinforcement of these packings and packing of similar construction present an overly abundant amount of wire to the valve stem, and with constant cycling of the valve stem requires repacking and valve reconstruction as early as three months due to valve stem wear.

Moreover, because these packings contain asbestos there is a problem when temperatures exceed 700° F. in which the water of hydration in the asbestos is driven away. This results in the production of ovine powder. When this occurs the entire packing looses water and shrinks. Also the packing hardens which prevents adjustment of the packing by tightening the gland bolts. Moreover, there are removal problems due to the virtual disintegration of the packing with exposure to the high temperature steam.

Thus, aside from wire abrasion problems, at temperatures above 600–700° F. in superheated steam the asbestos fibers begin to loose their water of hydration, forming ovine powder as has been noted in the EPRI valve system packing report by Stone & Webster Engineering Corporation, 1982. This results in shrinkage of the packing in the stuffing box, allowing leakage of steam, and requiring adjustment of the packing to stop the leakage. As noted in the report, the rubber and other binders in the packing harden, making adjustment difficult, if not impossible. As a result of the steam leakage, some of the asbestos fibers from the packing are carried into the air. Tests have found that some of these asbestos fibers carried into the air may be small enough to be respirable. These are the friable asbestos "fly", which has been named a carcinogen in 29 CFR 1910 and 1926 and for which specific standards have been set. As a result of these standards, and the hazards presented by handling asbestos packings, their use has been discouraged.

Regardless of the problems with asbestos, all these packings use an excessive amount of reinforcing wire, because all the yarn woven around the core is provided with wire. This results in excessive abrasion to the valve stems because all braiding in contact with the valve stem surface contains the reinforcing wire.

In an effort to solve all but the excessive wire problem, fiberglass reinforced with wire has been utilized, with the fiberglass provided in the core material to replace the asbestos and also as the woven material around the core for the same purpose.

The problem with fiberglass is that its relative long fibers break under changing pressures and temperatures and vibration, conditions which exist in the high temperature steam generating systems in which these packings are used. This again results in shrinkage. Moreover, the packing loses strength and suffers both the above removal problems and the utilization of an over amount of wire reinforcing because each overbraided yarn in these so called asbestos replacement packings contain reinforcing wire.

In order to solve the problem of packings using the pure fiberglass construction to replace asbestos, plastic cores with carbon fibers added to fiberglass, rubber, oil and zinc have been utilized for the core, and the overbraided structure contains some carbon fiber along with the wire and fiberglass.

Again the problem with such a packing is that it becomes extremely hard in service. Also shrinkage due to oil evaporation occurs and the oil also carbonizes which contributes to the hardening, a lack of adjustability and a shorter life span vis-a-vis the aforementioned asbestos braids based upon the experience of power generating plants. Here there are also removal problems and the problem of an overage of wire reinforcing material which causes abrasion on valve stems.

As another attempt to solve the problems with fiberglass, Chesterton style 1000 packing goes back to the use of asbestos, but uses a plaited or braided core of high purity asbestos instead of a plastic core. Again the core is provided with an outer braid of wire-reinforced asbestos. Here the plated core contains no oil or rubber which eliminates the hardening problems. However, an overage of wire is still in evidence. Moreover, there is shrinkage due to the drive off of the water hydration in the asbestos. The solution by Garlock style 1298 packing is the introduction of PBI (polybenzimidazole), in which PBI is substituted for asbestos and is braided about a carbon or graphite core. Additionally carbon fiber is utilized in the outer braid, along with wire and the PBI. The problems with this type of packing is that again too much wire is utilized. Shrinkage is also a problem which occurs with PBI above 700° F.

By way of further background, non-wire reinforced packings are used for low pressure applications in which a sturdier secondary yarn is braided on diagonal tracks to give packings strength, especially at their edges. Such diagonally-reinforced packings are described in U.S. Pat. Application Ser. No. 943,950, filed Dec. 18, 1986 and now U.S. Pat. No. 4,802,398 assigned to the assignee hereof. Whether single or double diagonals are reinforced, none of the packings described in this Patent Application are used for steam service. Nor are they wire-reinforced.

By way of additional background as to braiding techniques, it should be noted that the Parker Company produces a packing style in which carriers on the diagonal tracks carry a differently-colored yarn. This braid differs from conventional braid in that only every other carrier on a given track is provided with the differently-colored yarn. The result of this braiding technique is mostly decorative so as to provide a braid which has alternating light and dark areas.

Were one to provide the Parker braid with wire-reinforced yarn on the carriers utilized in a 3 track braider for the differently colored yarn, one might produce a reinforced packing. However, there would be a foot print on the valve stem which would permit steam passage through the non-reinforced braided portions. In other words, were the Parker braid provided with wire-reinforced yarn for the carriers involved in producing their braid, the resulting braid might not be of any use in steam service because non-reinforced channels or voids might be left running down the valve stem, thus permitting massive steam leakage.

SUMMARY OF THE INVENTION

In contradistinction to all of the above packings, the Subject System involves a reinforced non-asbestos packing in which the wire utilized is provided only on packing edges. This eliminates the use of wire between the inner edges, which reduces the amount of wire contacting the valve stem by as much as 80%. It has been found that edge reinforcing is all that is necessary for preventing steam leakage. By using a interlocking braider and a double diagonal wire-reinforced braid all edges are reinforced so that there can be no problem with backward or upside down installation of the packing. A single diagonal can be reinforced with wire, as long as there are markings on the packing so that it can be installed with the reinforced edge properly presented to the steam at the stem surface.

In a preferred embodiment, an alternating double diagonal braid is used to reduce the amount of wire which contacts the valve stem to only 18% of the braid touching the valve stem, thus minimizing abrasion. To effectuate this braid, alternating carriers on both diagonal tracks carry the wire-reinforced secondary yarn. As opposed to the Parker braid, here there is an offset in the wire-reinforced braid which results in complete circumferential sealing. This is produced by selecting which of the alternating carriers on each diagonal track carry the wire-reinforced yarn, such that the offset occurs. Should there be insufficient offset to provide a completely circumferential reinforced barrier to the steam due to an incomplete overlap of offset wire-reinforced yarns, this deficiency can be overcome using the keystone-resisting techniques of U.S. Pat. No. 4,550,639 issued to George B. Champlin on Nov. 5, 1985, incorporated herein by reference, which involves heavier or more warp yarns at the outer edges of the packing. The insufficient overlap is in part due to keystoning of the square packing when the packing is wrapped around a shaft. The above keystone-resisting configuration in effect cancels out the keystoning effect.

Assuming adequate overlap of the offset wire-reinforced yarns on the inside leading and trailing edges of the packing, the result is that wire reinforcing when viewed in the axial direction of the valve stem provides complete circumferential blockage, with the foot print being such that there are no unreinforced channels along the length of the valve stem which would permit steam leakage. Thus viewed end-on, for each packing ring, there is a circumferential barrier of reinforced packing presented to the steam which provides a continuous reinforced seal completely all around the valve stem.

The utilization of the alternating braid cuts the amount of metal contacting a valve stem to approximately 9% of that associated with other steam service packings. Were all carriers on each of the diagonals provided with wire reinforcement, there would still be a substantial reduction in the amount of wire reinforcement over the complete circumferential braiding associated with prior steam service packings. However, by utilizing the alternating braid of the Subject Invention an absolute minimum amount of wire reinforcing provides for complete reliable, long-life packing for steam valves and other steam service applications.

In order to eliminate the problems of asbestos, in a preferred embodiment all core and braid yarns are made of graphite or carbon. This eliminates, shrinkage, hardening or disintegration associated with asbestos packing previously used. The use of carbon or graphite also eliminates the problems of using fiberglass in high temperature, high pressure service.

As mentioned, it has been a practice in low pressure, low temperature applications to use packings reinforced with strong yarns, primarily aramid, on the corners to prevent extrusion. These packings have no metal reinforcement and are not suitable for high pressure steam service. It will be noted that these packings are made with the secondary yarn on all carriers of each diagonal track of the braiding machine. While an advantage for steam service is obtained if one were to provide reinforcing wire along with secondary yarn on all diagonal track carriers, this does not achieve a minimum amount of wire reinforcing. However, as compared to prior packings completely surrounded with wire-reinforced braids, wire reinforcing at interior corners reduces the wire contacting a valve stem by as much as 78%. A double diagonally-reinforced packing does eliminate the problem of backwards mounting of packing in a stuffing box adjacent a valve stem because there is no preferential direction. It will of course be appreciated that since the aforementioned prior double diagonal braid contained no metal reinforcement and has been made from materials which have thermal limitations of 600° F., such braid was not heretofore considered for utilization in high temperature steam applications.

In summary, edge-reinforced packing is provided for steam service, with wire-reinforced secondary yarns at one or more pairs of diagonally opposed corners of the packing to provide the edge-reinforcing which reduces valve stem abrasion while providing sufficient resistance to high pressure, high temperature steam leakage. Wire-reinforcing only the edges of the packing minimizes the amount of reinforcing wire necessary to counteract high pressure steam and thus minimizes valve stem wear. An offset, alternating braid embodiment further reduces wire usage at the packing edges, while at the same time providing complete circumferential reinforced sealing around the valve stem. In this embodiment selected alternating yarn carriers along a diagonal track are provided with secondary yarn reinforced with wire. The relationship of the carriers provided with reinforcing wire is such as to provide an offset, alternating braid in which the foot print along the surface of a valve stem is such as to provide a continuous reinforced barrier to steam pressure. In cases where the braiding results in voids in the steam barrier produced by the reinforced braid, keystone-resisting technology corrects this problem. In one embodiment, the packing is a non-asbestos packing which eliminates both hardening and packing disintegration. In a further embodiment with reinforcing wire on both diagonals, the diagonal symmetry alleviates problems associated with installing the packing backwards.

BRIEF DESCRIPTION OF THE DRAWINGS

These and other features of the Subject Invention will be better understood in connection with the detailed description taken in conjunction with the drawings of which:

FIG. 1A is a sectional and diagrammatic illustration of an automatic control valve for use in steam service, illustrating the utilization of the subject packing to prevent steam leakage around the valve stem;

FIG. 1B is a diagrammatic and sectional illustration of a manual steam valve utilizing the Subject packing;

FIG. 8A is a diagrammatic illustration of the effect of keystoning on the footprint of the wire-reinforced yarns on the surface of the valve stem, illustrating longitudinally running channels down the valve stem;

FIG. 8B is an end view of the footprint pattern associated with the keystoned packing, illustrating the void channels in cross-section;

FIG. 8C is a diagrammatic illustration of the packing of FIG. 8A in which keystoning is eliminated by a keystone-resisting original configuration, illustrating the overlapping of the alternating braids, thereby to provide a complete barrier to steam pressure;

FIG. 8D is a diagrammatic illustration of complete circumferential protection provided by an alternating braid in which overlapping is achieved;

FIG. 8E is a diagrammatic illustration of a keystone-resisting packing for use in steam service such as illustrated in FIG. 8C;

DETAILED DESCRIPTION

Figure 2A:
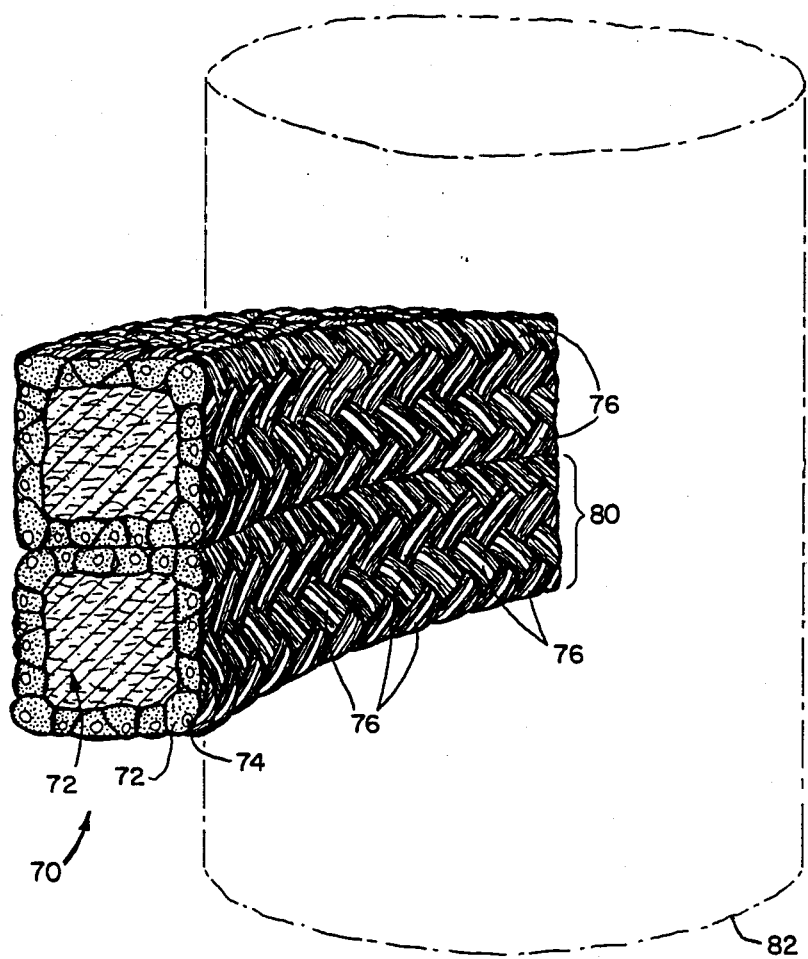
FIG. 2A is a diagrammatic illustration of a number of rings of packing having a plastic core made on a typical round braider, in which the inside surfaces of the rings are illustrated as carrying an overage of wire which contacts the surface of a valve stem shown here in dotted outline.

Referring to FIG. 1A, the Subject packing 10 may be utilized with a poppet control valve generally indicated by reference character 12 which includes a valve body 14 having a valve seat 16. Here a conical seal 20 is located at one end of a valve stem 22 which at its opposite end has a control rack 24 associated with a pinion 26 driven by worm gear 28. The worm gear is powered by motor 30 under control of a control unit 32 having as an input thereto the output of sensor 34 which, inter alia, senses either steam pressure or temperature.

Poppet valve 12 is controlled on a continuous basis which causes the valve stem and control rack to move up and down as indicated by double ended arrow 36 in response to the rotation of pinion 26 as illustrated by double ended arrow 38.

Valve stem 22 projects through a yoke nut 40 threaded into a yoke 42 and through a two part gland 44 and 46 in which the gland is tightened down over packing 10 via gland nuts 48 on studs 50, with the gland being secured to the stuffing box 52 that includes a flanged portion 54 through which studs 50 project. The packing is placed between the bottom surface 56 of gland 46 and a guide bushing 58 through which the valve stem projects and which is held in place by a set screw 60.

What will be appreciated is that this type of control valve and in fact any type of automatic control valve used in steam service reciprocates constantly under control of a sensed parameter. The result, as mentioned hereinbefore, is that with prior art packings the valve stem becomes scored, resulting in steam leakage and ultimate failure.

Because of the extensive amount of reinforcing wire utilized in prior art packings, the packing and indeed the entire assembly may need replacing as often as every year. The reinforcing wires are necessary in the presence of high pressure, high temperature steam, in which pressures exceed 2,000 lbs. per square inch and in which the temperatures exceed 700° F. While sealing against such high quality steam is essential in automatic control valves, the same situation exists with respect to manual control valves such as that pictured in FIG. 1B, in which like reference characters refer to like elements. Here the upper portion of valve stem 22 is threaded as can be seen at 62, with the threaded portion extending up through a yoke nut 40 to a conventional wheel 64. Here the stuffing box is integrally formed in a valve bonnet 68. Again, in steam service such a valve requires metal reinforcing wires embedded within the packing material, with the reinforcing wire typically being Inconnel wire.

Referring now to FIG. 2A, typically a prior art packing ring, here illustrated at 70, is produced on a two track braider. The packing includes a central core 72 of resilient or plastic material completely surrounded by wire-reinforced braid consisting of yarns 72, each of which have reinforcing wire 74 embedded therein.

The resulting braided structure is as illustrated, in which the inside surface of the packing ring is a braided structure in which wires are exposed across the entire inside surface of the packing. The exposed wire is illustrated by reference character 76 to present itself to the surface of a valve stem here diagrammatically illustrated at 82, in which the entire inner surface 80 of packing has wire protruding therefrom. What is pictured in FIG. 2A is the situation in which the packing material is placed under compression by the gland of the valve such that the Inconnel wire slices through the yarn in which it is embedded and is therefore in contact with the surface of the valve stem.

Regardless of the way in which the prior art packings are made, it will be appreciated that whether the packing is asbestos, or graphite, has a resilient core, or has a woven core, the result is the same. This result is that there is an overage of wire presented at the inside surface of the packing which serves to score the valve stem. The aforementioned attempts at preventing hardening and preventing disintegration of the packing while useful in extending packing life, do not address the issue of the large amount of bare wire exposed to the valve stem. Thus, regardless of whether the core of the packing is made of a pliable material or whether the packing is indeed made of asbestos or fiberglass, the result is the same in that regardless of the amount of times that the packing is changed, the scoring of the valve stem continues. In the past further leakage due to the scoring of the valve stem is prevented through the tightening of the packing around the valve stem. This however merely intensifies the scoring of the valve stem and while temporarily solving a leakage problem, ultimately results in the necessity of replacing the valve stem as well as the packing.

Figure 2B:
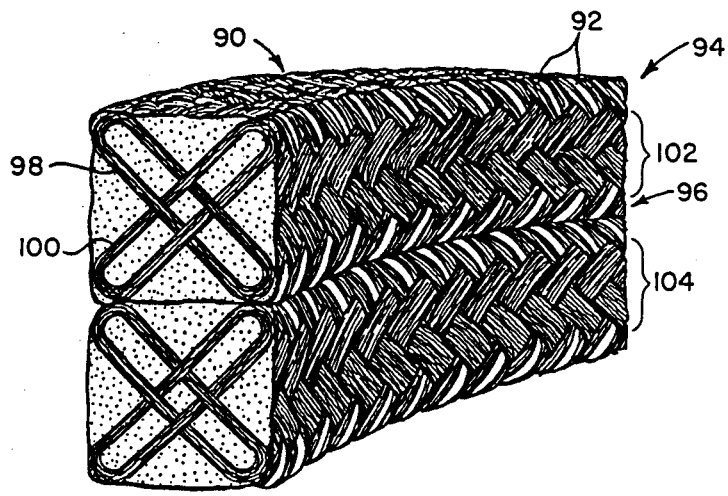
FIG. 2B is a diagrammatic illustration of edge reinforcement for a packing made in accordance with the Subject Invention on a four track braider, illustrating the inside surfaces of a pair of rings and a reduction of exposed wire.

In order to reduce the amount of wire necessary for providing a secure barrier against the high pressure, high temperature steam, while at the same time minimizing the extent of the wire used, and referring now to FIG. 2B a packing 90 made on a four track interlocking braider shows reinforcing wire 92 embedded only in yarns at the corners 94 and 96 of the packing. This is accomplished as diagrammatically illustrated by providing the bobbins on carriers running along the diagonal tracks 98 and 100 with yarns with embedded Inconnel wire. The resulting pattern illustrates that there is a central region 102 on the inside surface 104 of packing 90 which is completely devoid of wire. Because the reinforcing wire exists only at the edges of the packing, close to 80% of the wire previously thought necessary is removed. It has been demonstrated that adequate resistance to high temperature, high pressure steam is afforded by this reinforcing method.

In one embodiment the packing is made of non-asbestos materials such as pure graphite filament and wire reinforced carbon fiber, with the primary yarns on a double diamond track being of pure graphite filament and with the secondary yarns used on the diagonal tracks being of carbon fiber, which yarn is available with embedded Inconnel wire. It will be noted that in FIGS. 2B and 2C the double diamond primary braid tracks are not shown for convenience.

Figure 2C:
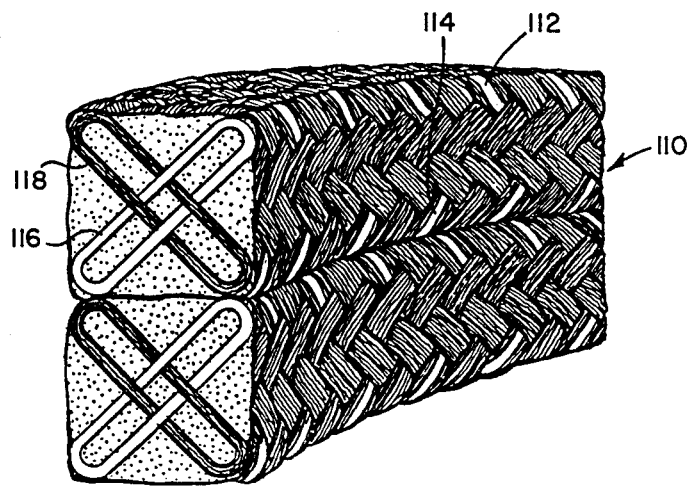
FIG. 2C is a diagrammatic illustration of the four track braided packing of FIG. 2B in which an offset alternating braid configuration is shown in which alternating edge yarns carry reinforcing wire.

Referring now to FIG. 2C, the amount of wire that is used can be reduced in half over that of FIG. 2B packing through an offset alternating braid so as to produce the packing illustrated at 110. Here sets of offset wires 112 and 114 create an effective reinforced barrier completely around the valve stem while at the same time using only half the wire. What this means is that with alternating yarns which are offset and overlapped in the longitudinal direction carrying the reinforcing wire, the wire content can be cut by as much as 80% over that associated with prior steam service packings. The method of producing such a braid will be discussed hereinafter. However, as illustrated by open track 116 and closed track 118, assuming that every other bobbin on each track is provided with reinforced yarn, the resulting pattern will be the offset overlapping structure pictured.

Figure 2D:
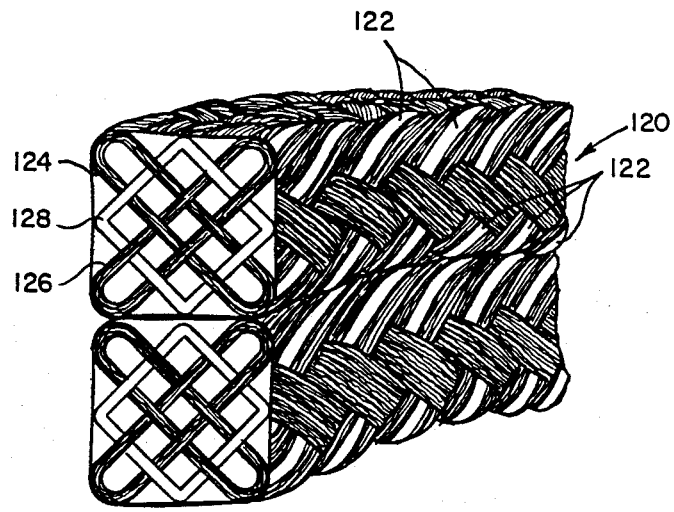
FIG. 2D is a diagrammatic illustration of an edge-reinforced packing made in accordance with the Subject Invention on a three track braider.
Figure 2E:
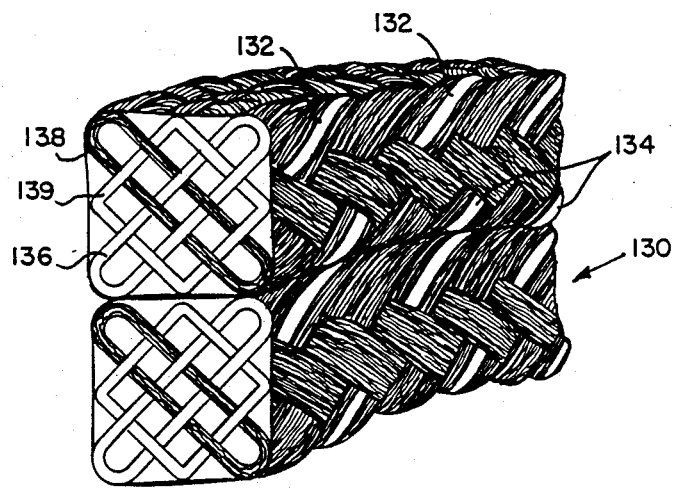
FIG. 2E is a diagrammatic illustration of an edge-reinforced packing made in accordance with the Subject Invention that can be installed with either reinforced inside edge toward the bottom of the stuffing box, in which alternating edge yarns carry reinforcing wire which presents a minimum of wire to the valve stem.

The braid shown in FIG. 2C is that produced by a four track interlocking braider, whereas the corresponding three track interlocking braid is shown by packing 120 in FIG. 2D and packing 130 in FIG. 2E.

Referring to FIG. 2D, those yarns carrying the reinforcing wire are illustrated at 122 to be at opposed corners of the packing. What this means is that each bobbin on each carrier running on each diagonal track 124 and 126 is provided with a secondary yarn having embedded reinforcing wire. In this diagram the single diamond track is illustrated at 128.

Referring to FIG. 2E, again the amount of wire utilized can be reduced if the exposed wire at the edges is in an offset overlapping configuration as illustrated by wires 132 and wires 134. Here the overlapping and alternation is formed in the same manner as described in connection with FIG. 2C. As before, and as illustrated by tracks 136 and 138, the alternating braid is produced by virtue of having alternating bobbins carrying the wire-reinforced yarn. Again the single diamond track is illustrated by track 140.

Figure 3:
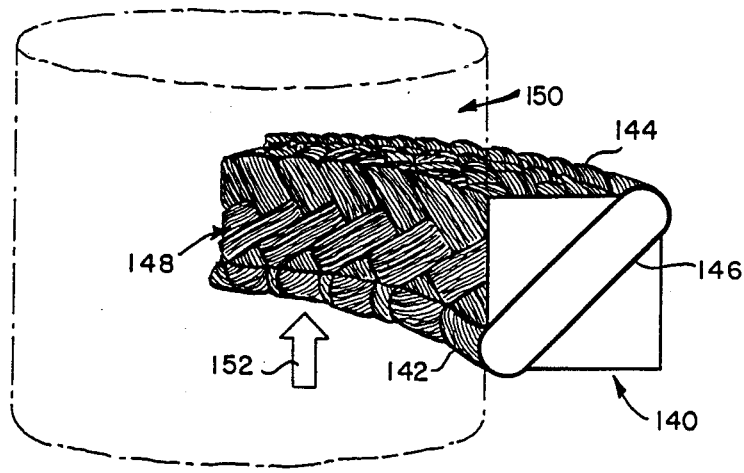
FIG. 3 is a diagrammatic illustration of a diagonally-reinforced packing which is directionally dependent in installation in which wire is utilized along with the secondary yarn to provide diagonal edge reinforcement and which presents a minimum of wire to the valve stem.

Referring now to FIG. 3, a diagonally reinforced packing 140 provides opposed corners or edges 142 and 144 with a wire-reinforced yarn, in which the packing is made similar to that associated with the aforementioned Patent Application, with the exception that the bobbins on diagonal track 146 carry wire-reinforced yarn as a secondary yarn, as opposed to the non-wire-reinforced secondary yarn described in the Patent Application. It is important however with respect to this embodiment, especially with respect to steam service, that the orientation of the braid be clearly marked. If the packing is put in backwards there will be immediate steam leakage because the reinforced corner adjacent surface 148 of valve stem 150 will be the trailing edge and merely flip up in the presence of steam pressure impinging on the packing from the direction indicated by arrow 152. However with appropriate marking on the packing, one can ascertain that edge 142 is adjacent surface 148, i.e. that the wire-reinforced edge 142 is presented to the steam as the leading edge of the packing.

Figure 4:
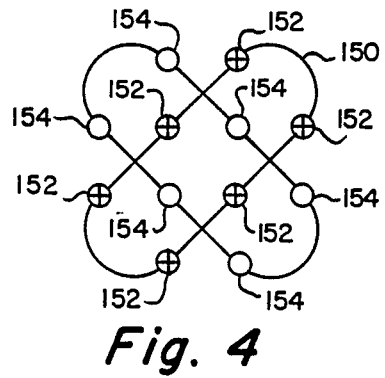
FIG. 4 is a diagrammatic illustration of the carriers on a single diagonal which are provided with yarn having embedded reinforcing wire for a three track interlocking braider.

Referring to FIG. 4, in this diagram the diagonally reinforced braid of FIG. 3 is achieved through the utilization of bobbins 152 carrying the wire reinforced secondary yarn, in one embodiment a yarn made of carbon fiber, whereas carriers 154 on an opposed diagonal track carry only non-reinforced yarn.

Figure 5:
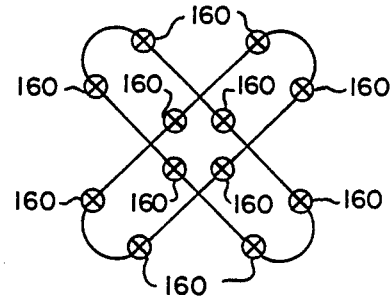
FIG. 5 is a diagrammatic illustration of a double-diagonal reinforced wire packing in which all carriers on each diagonal track are provided with yarn having embedded reinforcing wire for a three track interlocking braider.

Referring to FIG. 5, for a three track or four track interlocking braider, the packing shown in FIGS. 2B and 2D can be achieved by providing bobbins 160 on all diagonal tracks with wire-reinforced yarn.

Figure 6:
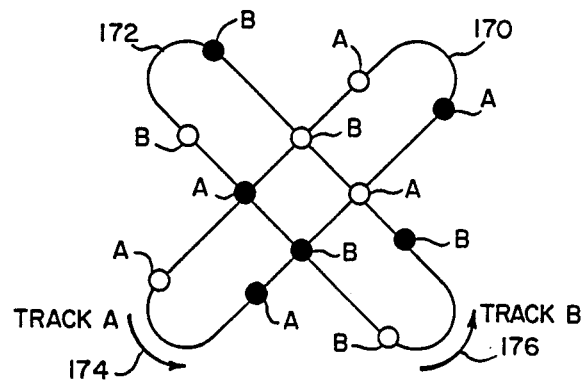
FIG. 6 is a diagrammatic illustration of the alternating braid embodiment in which alternating carriers are provided with yarn having embedded reinforcing wire for a three track interlocking braider.

Referring now to FIG. 6, the alternating braid providing the offset wire configurations of FIGS. 2C and 2E can be produced by providing alternate bobbins on a given diagonal with the wire-reinforced yarn. Here one diagonal track is illustrated by reference character 170, whereas the other diagonal track is indicated by reference character 172. The bobbins which carry the wire-reinforced yarn are represented by the blackened "A" circles on track 170, whereas those bobbins which Carry only the secondary yarn are illustrated by the open "A" circles on this track. Likewise for the opposed diagonal track 172, bobbins "B" which carry the wire-reinforced yarn are the blackened circles, whereas those carrying no reinforcing yarn are indicated by the open circles. The direction of movement of the respective bobbins on the track is indicated by arrows 174 and 176. It will be appreciated that there is a certain phasing of the carriers which produces the desired offset result, which in one embodiment involves the bobbins of track 170, the "A" bobbins, leading the "B" bobbins of track 172.

Figure 7A:
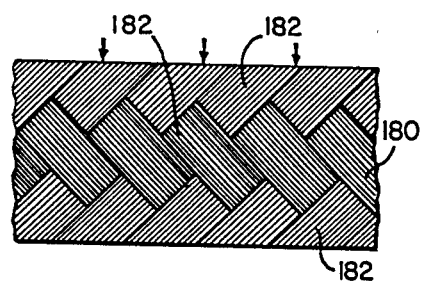
FIG. 7A is a diagrammatic illustration of the inside surface of a prior art packing illustrating the utilization of reinforcing wires embedded in all exterior braided yarn.
Figure 7C:
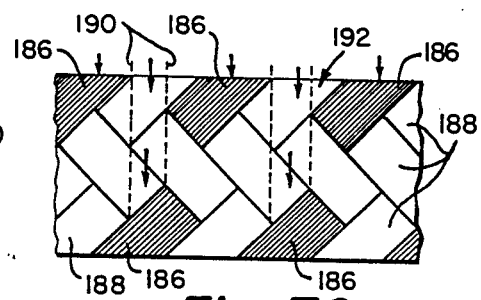
FIG. 7C is a diagrammatic illustration of an offset braid on a three track machine, illustrating the overlapping of the bottom wire-reinforced yarn with respect to the opposed top wire-reinforced yarns.
Figure 7B:
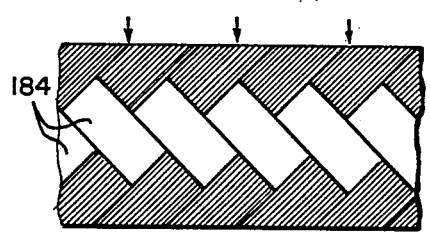
FIG. 7B is a diagrammatic illustration of the Subject Invention in which only corner yarns are provided with wire reinforcement.
Figure 7D:
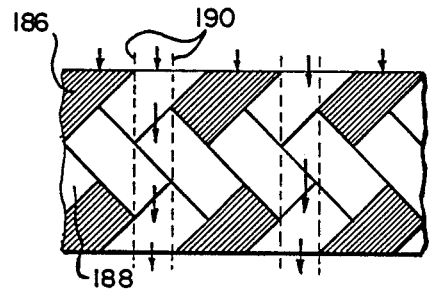
FIG. 7D is a diagrammatic illustration of the packing of FIG. 7C illustrating longitudinal gaps which can be caused by keystoning when the braid of FIG. 7C is wrapped around a valve stem or shaft.

Those experienced in the art of braiding will be able to load the secondary yarn on alternating carriers of track "B", such that "B" carriers lead or follow the carriers of track "A" so that of the resulting braid achieves the desired offset on the side of the packing intended to be placed in contact with the valve stem, as opposed to generating the undesired pattern on this surface as illustrated in FIG. 7D. The above-mentioned overlap will be graphically illustrated in connection with FIGS. 7B and 7C.

Referring however now to FIG. 7A, in the prior art it will be appreciated that the interior face 180 of the prior art braid includes woven yarns 182, with the shading indicating that each of the yarns carries a reinforcing wire. This is in contradistinction to the braid shown in FIG. 7B in which the central yarns 184 are devoid of reinforcing wire. This, at least diagrammatically illustrates a reduction of the wire which contacts the valve stem surface. It will be appreciated that the braid shown in FIGS. 7A, 7B, 7C and 7D are those available from a 3 track interlocking braider.

Referring now to FIG. 7C, the alternating braid pattern is shown in which the shaded yarns 186 are those carrying the reinforcing wire, whereas the remainder of the yarns 188 do not carry reinforcing wire.

More importantly with respect to this Figure, it will be appreciated that from one edge to the other of the inner surface of the packing, there is a channel illustrated by dotted lines 190 which do not present a reinforced edge to incoming steam, at least as far as the leading edge 192 of the packing is concerned. However, due to the overlap of the corresponding offset wire-reinforced yarn 188, there is essentially a reinforced packing portion which compensates for the initial void or gap.

It is however possible that longitudinal channels 190' can be left in a packing which does not have the appropriate offset of reinforced yarns 186 with respect to yarns 188. In this case there would be longitudinal channels down the valve stem which would not be reinforced and therefore subject to obstruction by the oncoming high power steam. This lack of overlap can be due to keystoning, when a square cross-section packing is wrapped around a cylindrical shaft. As will be seen in FIGS. 8C, 8D and 8E this problem of non-overlap of the alternating yarns can be solved through the utilization of the aforementioned keystone-resisting configuration, which in effect moves one set of wire-reinforced yarns with respect to the other, when the braiding is in place around the valve stem, so that the required overlap occurs to provide a complete circumferential reinforced barrier to the steam.

More specifically, and referring now to FIG. 8A, it can be seen that a valve stem 200 is provided with a conventional woven packing 202 which, when wrapped around the valve stem, assumes a keystone-type trapezoidal shape illustrated by keystoning 204. This in turn provides a footprint 206 of protection which leaves channels 208 devoid of the required reinforced packing material. This results in the formation of longitudinal channels 208 of FIG. 8B, down the length of the valve stem 200. The result of the introduction of such channels is that steam leakage is virtually assured as well as eventual destruction of the packing itself. As illustrated, and as described in the aforementioned patent, axial warps or warp yarns 210 conventionally used in all packings have the same density or same number, such that there is no protection against a square braid keystoning when wrapped around a cylindrical valve stem.

A method of preventing keystoning is illustrated in FIG. 8C. This method is described in the aforementioned patent and includes providing a packing ring 220 with a greater density of warp yarns 210 at the outer corners 212 of packing 220, whereas less dense or fewer numbers of warp yarns are used at positions 214 at the inner corners 216 of the packing. The resultant foot print, rather than being one involving no overlap, now has the required overlap as illustrated by the relative position of leading edge reinforced yarns 220 as opposed to the corresponding trailing edge yarns 222. Here the channel 224 while existing at the leading edge, is blocked by the overlapping yarn 222 at the trailing edge.

As illustrated in FIG. 8D, a complete circumferential protection is provided by virtue of the projection of the positions of the reinforced yarns onto a single plane as illustrated at 230.

The keystone-resisting packing described in the aforementioned patent is illustrated in FIG. 8E, in which the original keystone-resisting shape of the packing is illustrated by the solid line 232 which provides the packing 220 with a trapezoidal cross section equal to and opposite that which would be expected when a straight walled packing is wrapped around a cylindrical surface. By virtue of providing the keystone-resisting configuration, it is possible to control the overlap in the alternating braid configuration of the Subject Invention, so that an appropriate offset and coverage can be obtained.

Figure 9A:
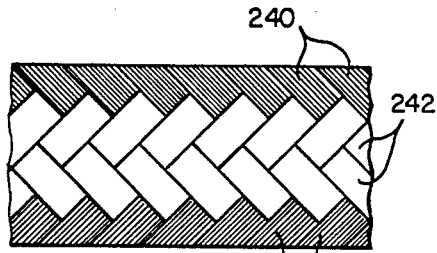
FIG. 9A is a diagrammatic illustration of edge reinforced packing produced on four track machine.
Figure 9B:
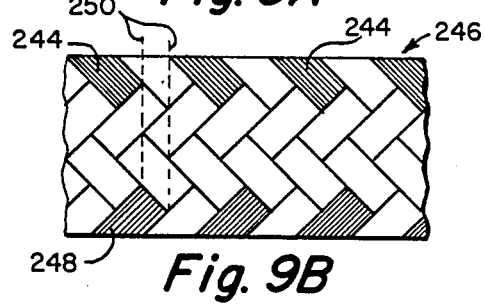
FIG. 9B is diagrammatic illustration of edge reinforced packing utilizing an alternating offset braid in which the bottom wire-reinforced yarn overlaps the adjacent top reinforced yarns.

Referring to FIG. 9A, packing 138 with the subject wire-reinforced edge is shown made on a four track interlocking braider in which all edge yarns 240 are wire-reinforced, whereas all intermediate yarns 242 carry only the secondary yarns without wire reinforcement. Referring to FIG. 9B a packing 139 is shown with the subject offset braid, in which yarns 244 are wire-reinforced at the leading edge 246 of the packing, whereas an overlapping yarn 248 is wire-reinforced on the trailing edge of the packing. It will be noted as indicated by dotted lines 250 that there are no longitudinal voids in the packing such as indicated in FIG. 7D by dotted lines 190′.

While keystoning is sometimes a problem with respect to a non-overlapped coverage of the offset yarns, in the four track braider such voids do not generally exist. Thus while keystone-resisting technology may be utilized in producing the four track packings illustrated in FIGS. 9A and 9B, such keystone-resisting technology may not be necessary to provide for the required overlap.

Note the offset alternating braid is applicable to two track plait braiders which can produce the alternating weave, with four, eight or twelve carriers.

Note also that while the subject packing has been described for use in steam service, it may be used in other hostile environments such as for valves which must handle chemical under high pressure; or for handling hazardous materials where packing integrity is important.

Having above indicated a preferred embodiment of the present invention, it will occur to those skilled in the art that modifications and alternatives can be practiced within the spirit of the invention. It is accordingly intended to define the scope of the invention only as indicated in the following claims:

We claim:

1. A braided packing having axial warp yarns and carrier yarns braided about said axial warp yarn comprising:
   said carrier yarns braided into a packing having a generally rectilinear cross section, the resulting packing having edges, the carrier yarns forming at least two diagonally opposed edges having a metal reinforcing wire embedded therein, with the carrier yarns not involved in forming said edges being devoid of reinforcing wire, whereby reinforcing wire usage is minimized.

2. The packing of claim 1, wherein the carrier yarns forming all diagonally opposed edges include reinforcing wire embedded therein.

3. The packing of claim 2, wherein each of the inner edges of said packing includes carrier yarns having reinforcing wire embedded therein and wherein said packing is the result of an alternating offset weave in which every other carrier yarn on an inside edge includes reinforcing wire and wherein there is overlap in the coverage provided by wire reinforced yarns at opposing inner edges, such that anon-wire reinforced yarn on one inner edge is width-wise aligned with a wire-reinforced yarn on the other inner edge of said packing.

4. The packing of claim 3 wherein said packing includes warp yarns at each edge thereof, with the density of warp yarns at the outer edges of said packing exceeding that of the warp yarns at the inner edges of said packing, whereby the resulting keystone-reduction results in appropriate overlap.

5. A method of reducing valve stem wear from packing material having axial warp yarns and carrier yarns braided about the warp yarns, surrounding the stem with comprising a rectilinear cross sectioned packing of said material, said packing having an inner surface with wire-reinforced carrier yarns at the edges of said inner surface, and with the carrier yarns making up the remainder of the inner surface of the packing being devoid of reinforcing wire, whereby a minimum amount of reinforcing wire is used to reduce valve stem wear.

* * * * *